United States Patent [19]
Kida et al.

[11] Patent Number: 5,368,063
[45] Date of Patent: Nov. 29, 1994

[54] HEATING SYSTEM FOR CONVEYOR PIPES

[75] Inventors: Masahiro Kida; Akio Kashiwagi; Junji Nakanishi; Tominori Sato, all of Hiranomachi; Masahiko Ohmura, Itami; Masahiro Nakamoto, Osaka; Masakazu Maruoka, Osaka; Mashashi Takata, Osaka, all of Japan

[73] Assignees: Osaka Gas Co., Ltd.; Miyawaki Incorporated, both of Osaka; Mitsubishi Cable Industries, Ltd., Amagasaki, all of Japan

[21] Appl. No.: 191,118

[22] Filed: Feb. 3, 1994

[30] Foreign Application Priority Data

Feb. 17, 1993 [JP] Japan ................... 5-052898

[51] Int. Cl.⁵ ............................................. F16K 49/00
[52] U.S. Cl. ................................. 137/340; 137/13; 137/312; 137/552; 165/39
[58] Field of Search ................. 137/13, 340, 312, 552; 165/39

[56] References Cited

U.S. PATENT DOCUMENTS

| | | | |
|---|---|---|---|
| 3,420,293 | 1/1969 | Campbell | 165/39 |
| 3,633,658 | 1/1972 | Kirschner et al. | 165/39 |
| 3,779,306 | 12/1973 | Wilson | 165/39 |
| 4,016,901 | 4/1977 | Kenny | 137/340 |
| 4,037,618 | 7/1977 | Kresser et al. | 137/13 |
| 4,278,069 | 7/1981 | Clark, Jr. | 165/39 |

*Primary Examiner*—A. Michael Chambers
*Attorney, Agent, or Firm*—Armstrong, Westerman, Hattori, McLeland & Naughton

[57] ABSTRACT

A long heating pipe is laid along a conveyor pipe and in contact with the outer surface thereof. The heating pipe is provided with an outer tube which has an operating fluid hermetically contained therein, and a steam tube which is inserted through the outer tube. A container is provided to accumulate condensation created as a result of the liquefaction of vapor fed through the steam tube of the heating pipe. This container has a temperature sensing valve located therein. The temperature sensing valve is closed if the condensation within the container more rises in temperature than predetermined, and this valve is opened if the condensation within the container more decreases in temperature than predetermined. This temperature sensing valve is communicatively connected to the downstream side end portion of the steam tube of the heating pipe, which is inserted into the container.

11 Claims, 7 Drawing Sheets

0
HEATING SYSTEM FOR CONVEYOR PIPES

BACKGROUND AND SUMMARY OF THE INVENTION

The present invention relates to a heating system for conveyor pipes which transport through them fluid such as a heavy oil or the like.

In general, a heavy oil or other similar fluid which has solidifiability, or viscosity increasing property under a low temperature, and undergoes thermal decomposition or other chemical phenomenon at a high temperature deteriorates in fluidity thereof in the winter season in which an atmospheric temperature is lower, because it is increased in the viscosity thereof. Therefore, in order to allow such a fluid to be smoothly conveyed through a conveyor pipe under a lower atmospheric temperature, provisions are made to heat the pipe, thereby decreasing the viscosity of the fluid which tends to increase. In a conventional heating system for conveyor pipes, the steam-trace heating method is executed by using a trap. The steam-trace heating method is available as two types. One of these two types is that a heating pipe is installed, and it is only formed with a steam layer therein to use the latent heat of the steam for heating the conveyor pipe, and the other is that a condensation layer is allowed to stay within the separately installed heating pipe, thereby utilizing the sensible heat thereof as well as the latent heat of the steam which is allowed to exit in the form of a layer.

However, in the former type heating method in which a steam layer is only formed within the heating pipe to use the latent heat of the steam, overheating is locally introduced on the contact surfaces of the heating pipe and the conveyor pipe with each other, or the heat to the conveyor pipe is excessively great in quantity, whereby it is difficult that the heating temperature to the conveyor pipe is held to a suitable range.

Also, the latter type heating method in which a condensation layer is allowed to stay in the heating pipe, the condensation layer is subjected to a temperature gradient on the downstream side thereof, and therefore, it is substantially impossible to know a total of precise quantity of heat given to the conveyor pipe. For this reason, it is difficult to estimate temperatures of the conveyor pipe and fluid flowing therethrough such as a heavy oil, which are to be heated. This is a disadvantage of the heating method in which a condensation layer is allowed to stay in the heating pipe.

Therefore, a counterproposal is made such as an electric heater system long in size which heats the conveyor pipe evenly at any longitudinal portion thereof. However, this electric heating system threatens excessive heating of the conveyor pipe, while at the same time, the electric heating system undergoes a problem in which it can not be applied to any conveyor pipe conveying therethrough a heavy oil or any other similar fluid which requires explosion-proof provisions to be made.

It is therefore an object of the present invention to provide for an explosion-proof heating system for conveyor pipes transporting therethrough a heavy oil or other similar fluid, in which they are longitudinally heated evenly at any portion of them to a predetermined temperature, and which is feasible of installing works thereof.

BRIEF DESCRIPTION OF THE DRAWINGS

The present invention will be described with reference to the accompanying drawings, in which.

DETAILED DESCRIPTION OF THE PREFERRED EMBODIMENTS

Preferred embodiments of the heating system according to the present invention will be described with reference to the accompanying drawings.

Figure 4:
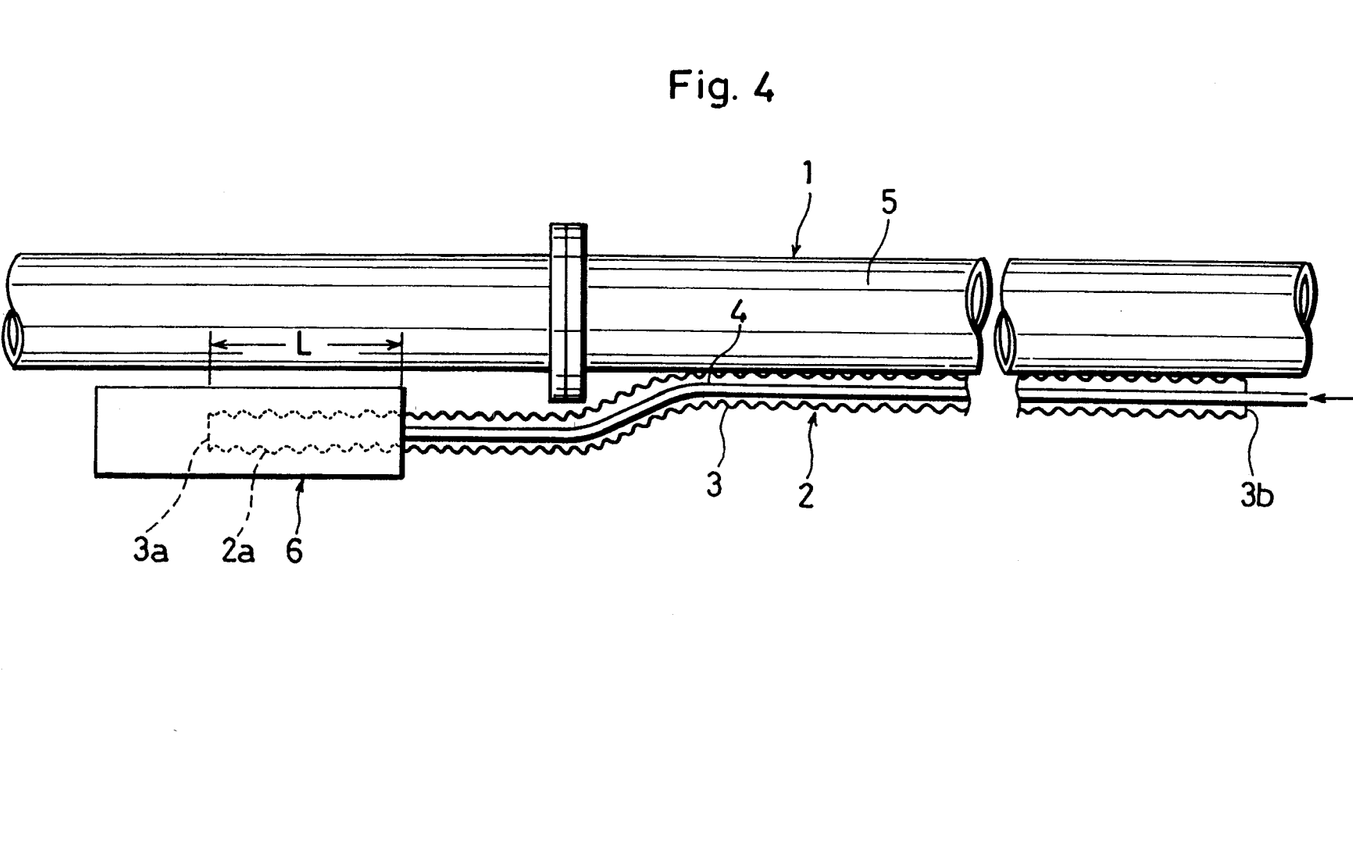
FIG. 4 is a schematic view which shows the attachment of the heating system of the present invention to a conveyor pipe.

In FIG. 4, a heating system for conveyor pipes according to the present invention comprises a long heating pipe 2 located along a conveyor pipe 1. This heating pipe 2 is provided with an outer tube 3 and a steam tube 4 which is inserted through the outer tube 3, and the outer tube 3 has an operating fluid contained hermetically therein such as to be free from any leakage of the fluid.

The outer tube 3 is such as a corrugated tube made of copper, aluminum or other metal and having an anticorrosive treatment applied thereto, or a corrugated tube which is alike made of metal, and is sheathed on the surface thereof with a synthetic resin, for example, polyethylene or other similar material. Also, the outer tube 3 is closed in opening portions thereof at both ends thereof by using closing caps 3a, 3b.

Applicable as the operating fluid contained in the outer tube 3 is such as water, fluorocarbon or other equivalent which can evaporate as a result of conduction and radiation of the heat from the steam tube 4 thereto, and can condense if it comes into contact with the inner surface of the outer tube 3, thereby operating to equalize surface temperatures of the outer tube 3 at any portion thereof. In this case, the steam tube 4 is desired to be immersed in the operating fluid while no steam flows through the steam tube 4.

The steam tube 4 is formed by using a copper tube or any other similar pipe, and is passed through the closing caps 3a, 3b of the outer tube 3, to thereby allow it to be inserted through the outer tube 3.

After the outer tube 3 is evacuated, and the operating fluid is degased, the operating fluid is poured into the outer tube 3. The outer tube 3 is held in the internal pressure thereof which ranges between approximately $10^{-4}$ Torr and approximately $10^{-5}$ Torr.

With such an arrangement of the heating pipe 2, the feed of a heating vapor through the steam tube 4 from the upstream side thereof (the right hand side in FIG. 4) turns the operating fluid contained in the outer tube 3 into vapor as a result of thermal transmission and thermal radiation to the fluid, thereby allowing the operating fluid to flow smoothly between the internal surface of the outer tube 3 and the steam tube 4.

The operating fluid in the form of vapor diffuses within the outer tube 3 by using convection thereof over the entire length of the outer tube 3, and condenses adjacent to the internal surface of the outer tube 3. As a result, the outer tube 3 is evenly heated on any surface portion thereof, and generates heat outwardly. Therefore, the conveyor pipe 1 is heated, because an outer surface 5 thereof is brought into contact with the heating pipe 5.

The heating pipe 2 may range in length between such as several meters to several kilometers. However, it is optimum from the viewpoints of heating efficiency to furnish the heating pipe 2 with length of several meters to several hundreds meters.

Figure 1:
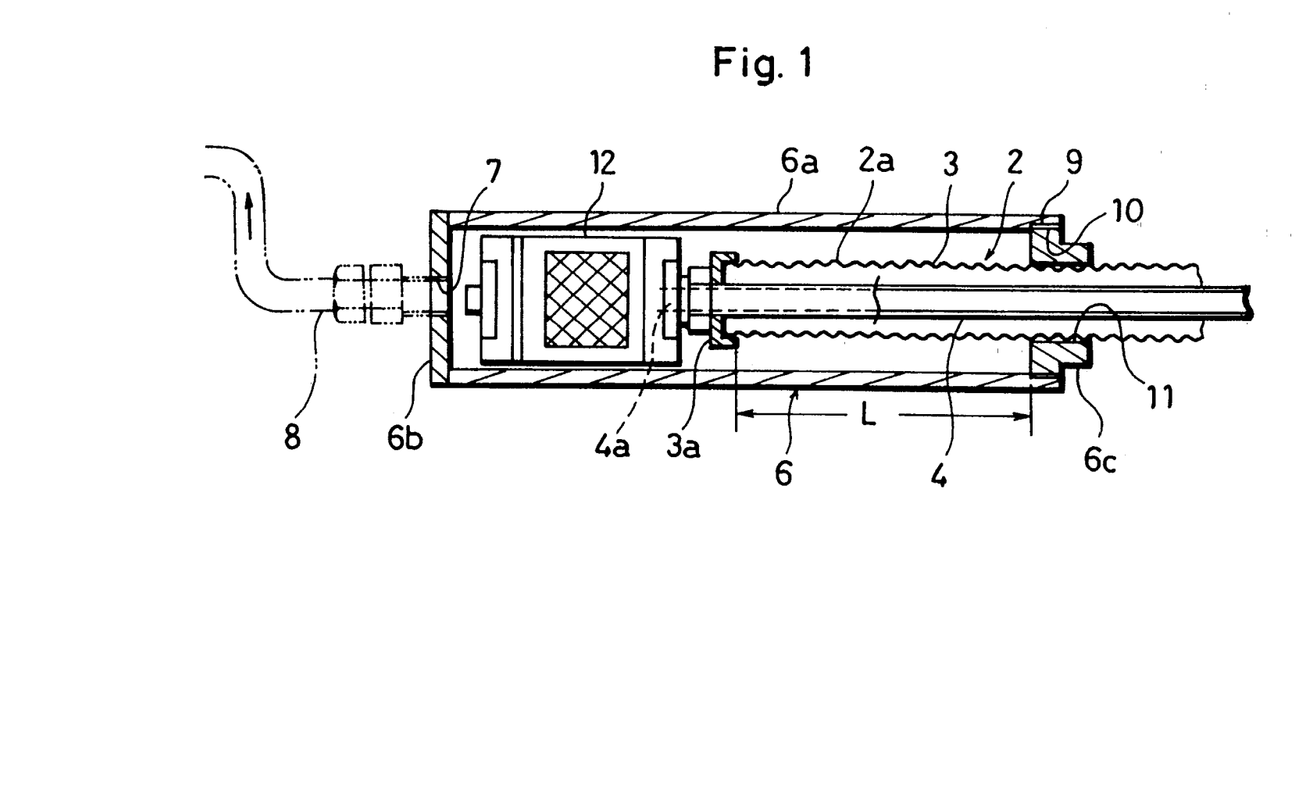
FIG. 1 is a cross sectional view of a principal portion of a heating system of the present invention according to a first preferred embodiment thereof.

A downstream side end portion 2a of the heating pipe 2 (or the outer tube 3) is inserted into a container 6 by predetermined length L. As shown in FIG. 1, the container 6 comprises a cylindrical body portion 6a, a cap member 6b which covers an opening portion at one end portion of the cylindrical body portion 6a, and a spacer member 6c which is attached to the other end opening portion of the cylindrical body portion 6a to hold the heating pipe 2.

The predetermined length L by which the outer tube 3 is fitted into the container 6 is a distance between the spacer member 6c and the closing cap 3a, and is set to, for example, approximately 40 mm to approximately 200 mm.

The cap member 6b is provided with a discharging hole 7, and has a discharging pipe 8 communicatively connected thereto by passing it through the discharging hole 7 as shown with an imaginary two-dot chain line in FIG. 1.

The spacer member 6c is formed with a threaded portion 9 on the outer circumferential surface thereof, and this threaded portion 9 is engaged with the tapped portion 10 formed on the inner circumferential surface of the downstream side end portion of the cylindrical body portion 6a. The spacer member 6c has the heating pipe 2 passed through an axial hole thereof, and an internal circumferential surface 11 of the spacer member 6c and a corresponding external circumferential surface of the heating pipe 2 are hermetically joined together into a single unit body by using brazing or any other suitable means.

A downstream side end portion 4a of the steam pipe 4 is passed through the closing cap 3a of the outer tube 3, and has a temperature sensing valve 12 communicatively connected thereto which is accommodated in the container 6.

Figure 2:
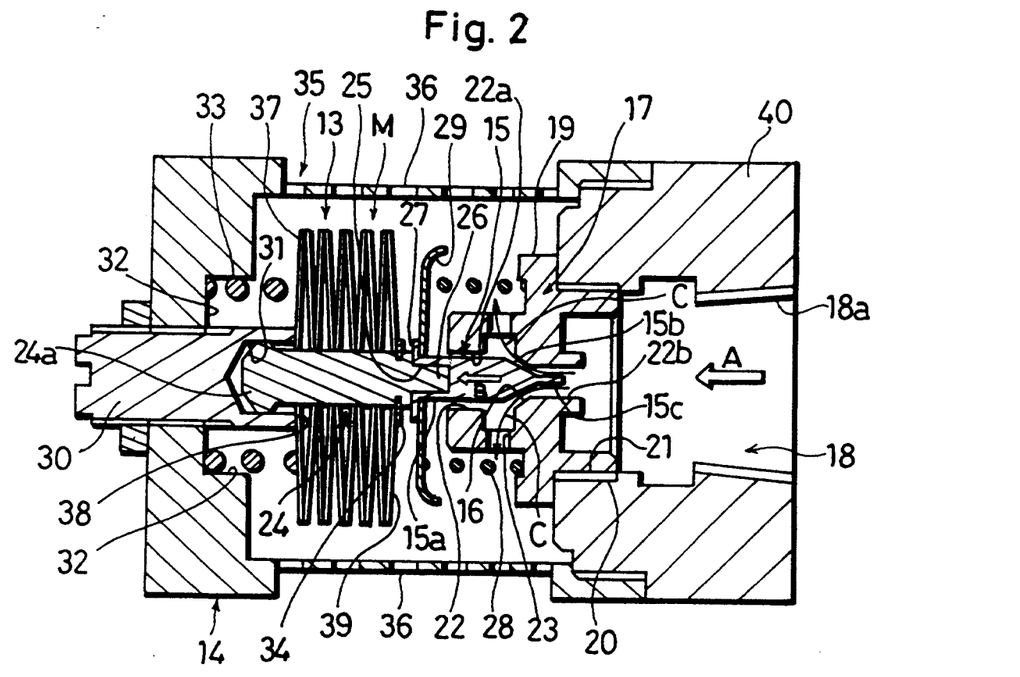
FIG. 2 is an enlarged sectional view of a temperature sensing valve applied to the heating system shown in FIG. 1, showing a clearance between the valve seat of a receiving member and a valve member, both of which are components forming the heating system of the present invention.
Figure 3:
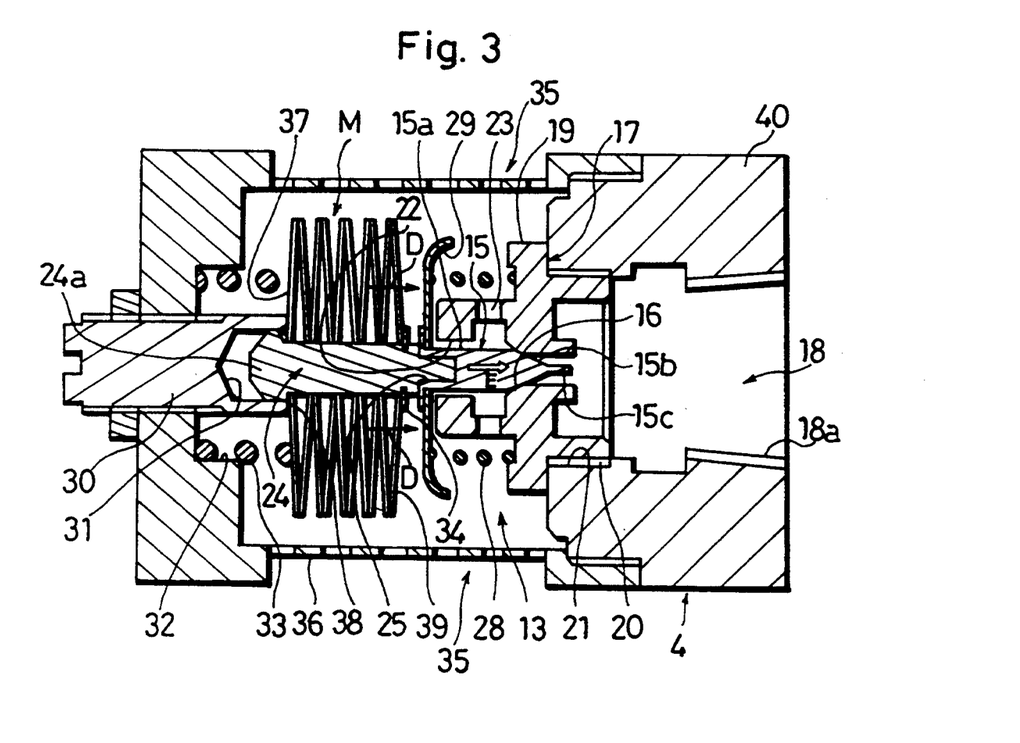
FIG. 3 also is an enlarged sectional view of a temperature sensing valve applied to the heating system shown in FIG. 1, in which the valve member is a fully closed position thereof, and as a result, the clearance shown in FIG. 3 is closed.

As shown in FIGS. 2 and 3, the temperature sensing valve 12 comprises a valve body 14 provided with a hollow chamber 13, a valve member 15 contained in the hollow chamber 13, and a receiving member 17 equipped with a valve seat 16 which receives the valve member 15.

The valve body 14 is formed with an ingress opening 18 on the upstream side thereof, and the receiving member 17 is attached to the downstream side end portion of this ingress opening 18. The ingress opening 18 is communicatively connected to the hollow chamber 13, and vapor or condensation is introduced into the hollow chamber 13 via the ingress opening 18.

The receiving member 17 is provided with a projecting outer flange portion 19 in the axially middle portion thereof, and is formed with a threaded portion 20 on the upstream side thereof from the outer flange portion 19. This threaded portion 20 is engaged with a downstream side threaded end portion 21 of the ingress opening 18, to thereby achieve the attachment of the receiving member 17 to a receptacle portion 40 of the valve body 14.

The ingress opening 18 is provided with a threaded portion 18a on the upstream side thereof. This threaded portion 18a is engaged with the downstream side end portion 4a of the steam pipe 4, to thereby allow the steam pipe 4 to be communicatively connected to the temperature sensing valve 12. See FIG. 1.

Also, an aperture portion of the receiving member 17 is provided with an insertion portion 22 which has the valve member 15 fitted thereinto, and this insertion portion 22 has holes 23 made therethrough which are communicatively connected to the hollow chamber 13.

The insertion portion 22 for the valve member 15 comprises a large-diameter portion 22a (for guiding the valve member 15) which is slightly greater in the inside diameter thereof than the outside diameter of the valve member 15, and a small-diameter portion 22b which is communicatively connected to the large-diameter portion 22a through a tapered portion. See FIG. 2. A tapered portion formed between the large-diameter portion 22a and the small-diameter portion 22b acts as the valve seat 16 which receives the valve member 15.

Also, the valve member 15 comprises a body portion 15a in a columnar configuration, and a small-diameter portion 15c which is projected through the tapered portion 15b towards the upstream side of the valve member 15.

This valve member 15 is held upon a stem member 24. That is to say, the body portion 15a of the valve member 15 is formed with an opening portion 25 on the downstream side end surface thereof, and an upstream side end portion 26 of the stem member 24 is fitted into the opening portion 25 of the body portion 15a. Also, the body portion 15a is provided with an outer flange portion 27 on the downstream side thereof, and this flange portion 27 has a holding member 29 secured thereon to support a spring means or other similar resilient means 28. See FIG. 2.

The spring means 28 is interposed between the holding portion 29 and the flange portion 19 of the receiving portion 17 to force the valve member 15 in the downstream side direction. See FIG. 2.

The stem member 24 is fitted with a first heat sensing body M. This first heat sensing body M is formed such that a plurality of sensing elements are in series arranged in layers to allow every two adjacent elements to be opposed. In this case, the low-expansion sides of the sensing elements are inwardly concaved to ensure that force to deform them acts in the direction in which the spring means 28 is forced. Also, some suitable number of sensing elements may be grouped into a set, and every two sets of sensing elements may be opposed.

The stem member 24 upon which the first heat sensing body M rests is provided with a bulging portion 24a at the downstream side end portion thereof, and this bulging portion 24 is slidably inserted into a recessed portion 31 of a downstream side stem 30.

The hollow chamber 13 is provided with a recessed portion 32 in the downstream side end surface thereof, and this recessed portion 32 has a second heat sensing body 33 fitted therein. This second heat sensing body 33 is made of a shape memory alloy.

The second heat sensing body 33 only functions when failure to seat the valve member 15 in the temperature sensing valve 12 causes extreme rise in the temperature of the condensation within the container 6.

That is to say, the second heat sensing body 33 is operated to exert great force upon the first heat sensing body M by using deformational strain of the atoms of the shape memory alloy which is caused by martensitic transformation thereof, thereby achieving stronger sealability between the valve member 15 and the valve seat 16.

The valve body 14 is provided with window portions 35, 35, and the window portions 35, 35 are fitted with passing plates 36, 36 through which the condensation passes. The passing plates 36, 36 comprise, for example, wire gauze or other similar material.

The second heat sensing body 33 is arranged to be greater in resilient force thereof than the spring means 28.

In the temperature sensing valve 12 arranged as described in the foregoing, if the condensation is introduced into the ingress opening 18 as shown with the arrow A in FIG. 2, a pressure of the condensation forces the valve means 15 in the downstream side direction of the temperature sensing valve 12 as shown with the arrow B in FIG. 2, thereby creating a clearance between the valve seat 16 of the receiving member 17 and the tapered portion 15b of the valve means 15.

As a result, the condensation enters such a clearance from the small-diameter portion 22b of the receiving member 17 as shown with the arrow C in FIG. 2, extends to the hollow chamber 13 from this clearance through the holes 23, and comes into the container 6 from the hollow chamber 13 through the passing plates 36, 36 of the window portions 35, 35.

In operation, the vapor fed through the steam pipe 4 of the heating pipe 2 from the upstream side thereof is condensed into condensation, and this condensation stays within the steam pipe 4 on the upstream side of the temperature sensing valve 12 and also within the container 6.

If a continuous feed of the vapor heats the steam pipe 4 and the operating fluid in order, the downstream side end portion 2a of the predetermined length L (shown in FIG. 1) of the heating pipe 2 is increased in the temperature thereof, to thereby heat the condensation.

If the condensation becomes higher in the temperature thereof than predetermined, the first heat sensing body M is subjected to greater force to deform it, and consequently, is axially stretched, whereby the valve member is closed.

In this case, since a downstream side end surface 37 of the first heat sensing body M is brought into contact with an upstream side end surface 38 of the downstream side stem 30, an upstream side end surface 39 of the first heat sensing body M moves as shown with the arrow D in FIG. 3. This moves the valve member 15 in the upstream side direction as shown with the arrow E in FIG. 3, and as a result, the tapered portion 15b of the valve member 15 is brought into close contact with the valve seat 16, to thereby bring to a stop any influx of the condensation into the hollow chamber 13.

It is thus prevented that the entire body of the heating pipe 2 is more increased in the temperature thereof than predetermined, whereby the conveyor pipe 1 is overheated.

If the entire body of the heating pipe 2 is to the contrary decreased in the temperature thereof owing to suspension of a vapor feed, the downstream side end portion 2a of the heating pipe 2 which extends into the container 6 thermally interrelates therewith, and drops in the temperature thereof. The condensation which is in contact with this end portion 2a of the heating pipe 2 is accordingly reduced in the temperature thereof, to thereby contract the first heat sensing body M of the temperature sensing valve 12.

In this case, the valve member 15 is forced in the direction indicated with the arrow B in FIG. 2 by using the resiliency of the spring means 28 which surpasses the bending force of the first heat sensing body M, and the pressure of the condensation introduced from the ingress opening 18. As a result, the valve means 15 is opened, and the condensation enters the hollow chamber 13 and the container 6.

The temperature sensing valve 12 is subjected to thermal equilibrium, depending upon the temperatures of the condensation which stays on the upstream side of the ingress opening 18, and this occasionally causes a slight clearance to be kept between the tapered portion 15b of the valve means 15 and the valve seat 16.

In the heating system arranged as described in the foregoing, if the steam pipe 4 of the heating pipe 2 is fed with the vapor from the upstream side thereof, the outer tube 3 thereof is longitudinally evenly heated on any surface portion thereof, and the conveyor pipe 1 brought into contact with the heating pipe 2 is accordingly heated on the outer surface 5 thereof.

The vapor fed through the steam pipe 4 from the upstream side thereof enters the container 6 through the temperature sensing valve 12, and is collected as condensation in this container 6.

If the steam pipe 4 is continuously fed with the vapor, the heating pipe 2 is increased in the surface temperature thereof, while at the same time, the downstream side end portion 2a of the heating pipe 2 which extends into the container 6 causes an increase in the temperature of the condensation in the container 6.

If the condensation increases in the temperature thereof to a predetermined value, the temperature sensing valve 12 is closed, to thereby bring to a stop any flow of the vapor through the valve. If the vapor flow is thus suspended, the heating pipe 2 decreases in the surface temperature thereof, while at the same time, the condensation also drops in the temperature thereof. If the temperature of the condensation more decreases than predetermined, the temperature sensing valve 12 is opened, whereby the condensation staying in the steam tube 4 is fed into the container 6. As a result, new vapor is introduced into the steam tube 4 of the heating pipe 2, thereby allowing the heating pipe 2 to increase again in the surface temperature thereof.

If the condensation staying within the steam tube 4 is fed into the container 6 from the temperature sensing valve 12, the old condensation within the container 6 is discharged from the discharging pipe 8 through the discharging hole 7.

In the heating system according to the present invention, the outer tube 3 of the heating pipe 2 can be held in the surface temperature thereof to the substantially same temperature value at any longitudinal portion thereof.

The following experimental examples are illustrative of the present invention.

Figure 6:
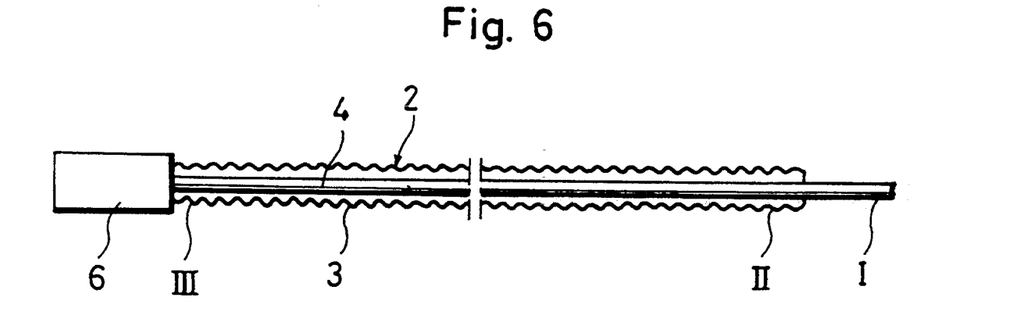
FIG. 6 is a schematic diagram which shows temperature measuring points in the conveyor pipe combined with the heating system of the present invention.

As shown in FIG. 6, the downstream side end portion of the heating pipe 2 of 3 m in length is inserted into the container 6 by 80 mm, and the steam tube 4 of this heating pipe 2 is communicatively connected in the downstream side end portion 4a thereof to the temperature sensing valve 12 which is predetermined in the operating temperature thereof for 40° C., to thereby form the heating system of the present invention.

This steam pipe 4 of the heating pipe 2 is fed with the vapor from the upstream side thereof, and surface temperatures of the steam pipe 4 were measured at three places (I), (II) and (III) thereof as shown in FIG. 6. The outer tube 3 of the heating pipe 2 was formed by covering with a polyethylene sheath of 1.0 mm in the thickness thereof a corrugated copper tube of 27.1 mm in the outside diameter thereof, 0.5 mm in the thickness thereof, and 24.5 mm in the mean inside diameter.

Also, pure water was introduced as the operating fluid through the outer tube 3 until it amounted to 30% of the inside capacity of the outer tube 3, and the outer tube 3 was internally evacuated to $10^{-4}$ Torr to approximately $10^{-5}$ Torr.

Moreover, the steam tube 4 was a straight copper tube of 9.6 mm in the outside diameter thereof and 8.0 mm in the inside diameter.

Figure 5:
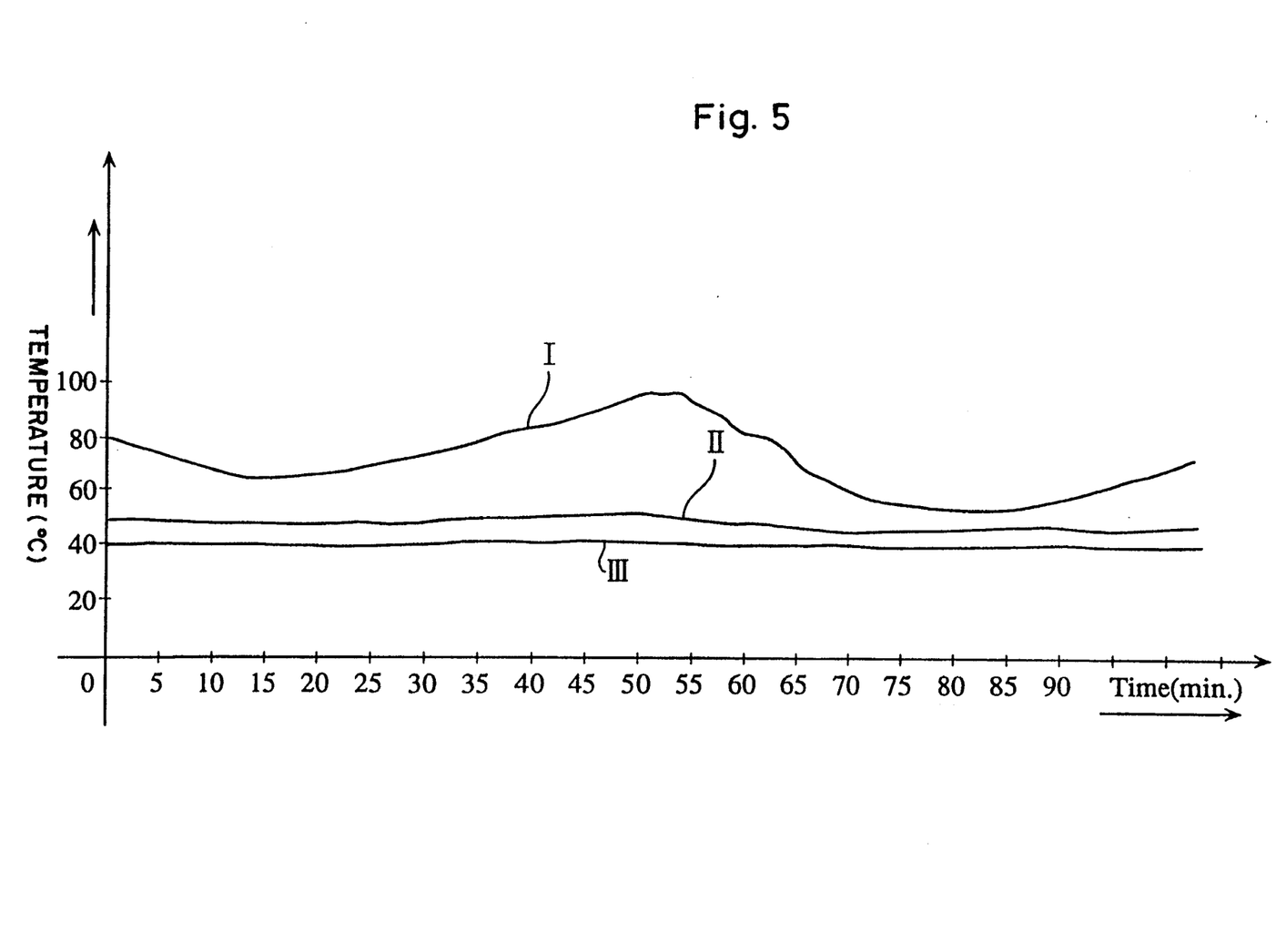
FIG. 5 is a graph which shows a variation in surface temperatures of a steam tube of a heating pipe which is a principal element of the heating system according to the present invention.

The results of measurements of the surface temperatures of the outer tube 3 and the steam tube 4 are as graphed in FIG. 5. As shown at the numeral I in the graph of FIG. 5, the upstream side surface temperature of the steam tube 4 (which is at the place I shown in FIG. 6) relatively greatly varies, while on the other hand, the surface temperature of the outer tube 3 at the upstream end thereof (which is at the place II shown in FIG. 6) also remains constant at approximately 47° C. as shown at the numeral II in the graph of FIG. 5. The surface temperature of the outer tube 3 at the downstream end thereof (which is at the place III shown in FIG. 6) remains constant at 40° C. as shown at the numeral III in the graph of FIG. 5.

Therefore, it will be understood that the heating pipe 2 arranged as described in the foregoing can allow the surface temperature thereof to remain substantially constant at any longitudinal portion thereof.

Figure 7:
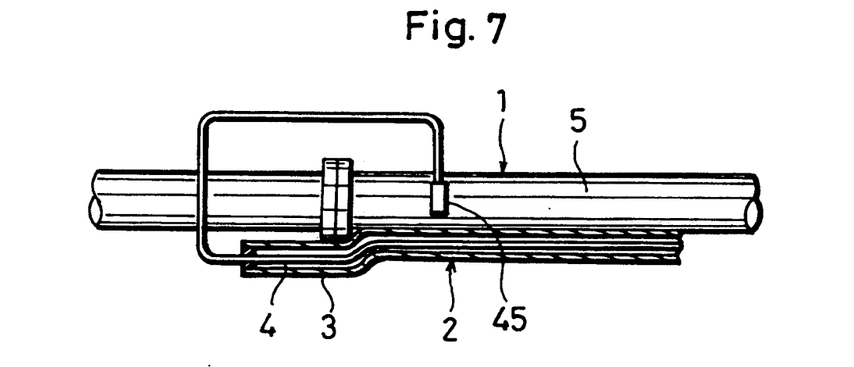
FIG. 7 is a schematic diagram which shows an example of the combination of the heating system of the present invention with the conveyor pipe.
Figure 8:
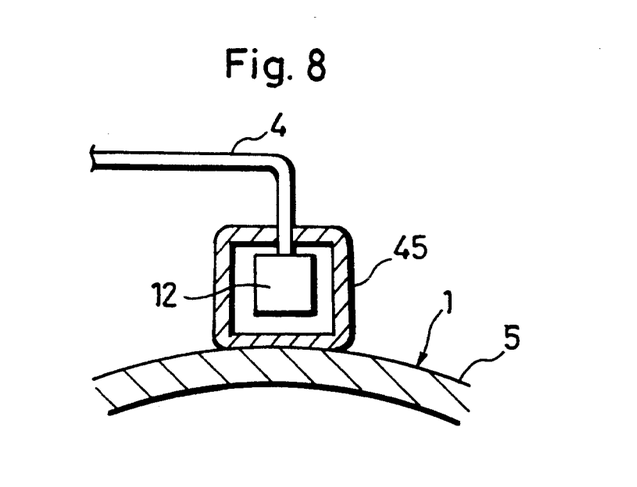
FIG. 8 is an enlarged sectional view of a principal portion of the heating system of the present invention which is combined with the conveyor pipe as shown in FIG. 7.

The inventor of the present application also contrived an experimental example shown in FIGS. 7 and 8. In this example, the heating pipe 2 is also provided with the outer tube 3 having the operating fluid hermetically contained therein, and the steam tube 4 inserted through the outer tube 3.

In this case, however, the downstream side end portion of the steam tube 4 is arranged to greatly extend from the outer tube 3, and is fitted with the temperature sensing valve 12 at the end thereof, which is contained in a box type body 45. The box type body 45 is designed to receive and accumulate the condensation fed from the steam tube 4. This box type body 45 is attached to an outside surface of the conveyor pipe 1.

In this case, therefore, the temperature control of the conveyor pipe is performed by detecting the temperature of the condensation within the box type body 45. More specifically, if the temperature of the condensation within the box type body 45 drops below a predetermined temperature for the condensation, the temperature sensing valve 12 is opened, to thereby allow the condensation to flow afresh through the steam tube 4, and if the temperature of the condensation within the box type body 45 rises above a predetermined temperature for the condensation, the temperature sensing valve 12 is closed, thereby bringing to a stop the flow of the condensation through the steam tube.

Truly, in this case, the heating pipe 2 can allow the surface temperature thereof to remain substantially constant at any longitudinal portion thereof, while at the same time, it is possible to economize the working amount of the vapor fed through the steam tube. However, the steam tube 4 is arranged to allow the downstream side portion thereof to greatly extend out of the outer tube 3, and for this reason, the downstream side portion of this steam tube 4 more decreases in the temperature thereof than the upstream side portion thereof, to thereby create a temperature gradient in the steam tube. Moreover, temperatures of the conveyor pipe 1 is difficult of transmission to the box type body 45 as compared to transmission of temperatures of the conveyor pipe to the temperature sensing valve 12 in the present invention.

Therefore, the conventional heating system shown in FIGS. 7 and 8 is inferior in the sensitivity thereof temperatures of the conveyor pipe 1, and is inclined to overheat the conveyor pipe 1 and therefore the internal heavy oil or other fluid of the conveyor pipe 1. For this reason, this type conventional heating system is not favorable to the efficient temperature control of the conveyor pipe.

Also, in the conventional heating system shown in FIGS. 7 and 8, the temperature sensing valve 12 and the other related equipments must be installed in the field in which the heating system is located. Therefore, the conventional heating system is inferior in the installing efficiency.

On the other hand, the conveyor-pipe heating system according to the present invention uses for the temperature control of the conveyor pipe temperatures of the condensation staying within the container 6 into which the downstream side end portion 2a of the heating pipe 2 extends. For this reason, the heating pipe 2 (and the end portion 2a thereof), the condensation and the temperature sensing valve 12 can easily cooperate with one another. Therefore, it is feasible to control surface temperatures of the heating pipe 2 with higher sensitivity or accuracy.

Also, in the conveyor-pipe heating system according to the present invention, since the container 6 having the temperature sensing valve 12 held therein is provided at the downstream side end portion 2a of the heating pipe 2 in a manufacturing shop of the heating system prior to the delivery of the heating system, it is easily feasible to install it at the installation field.

On the other hand, the conventional conveyor-pipe heating system shown in FIG. 7 makes it necessary to execute at the installing field a bending and laying operation of the exposed section of the steam tube 4, and a mounting operation of the box type body 45.

Figure 9:
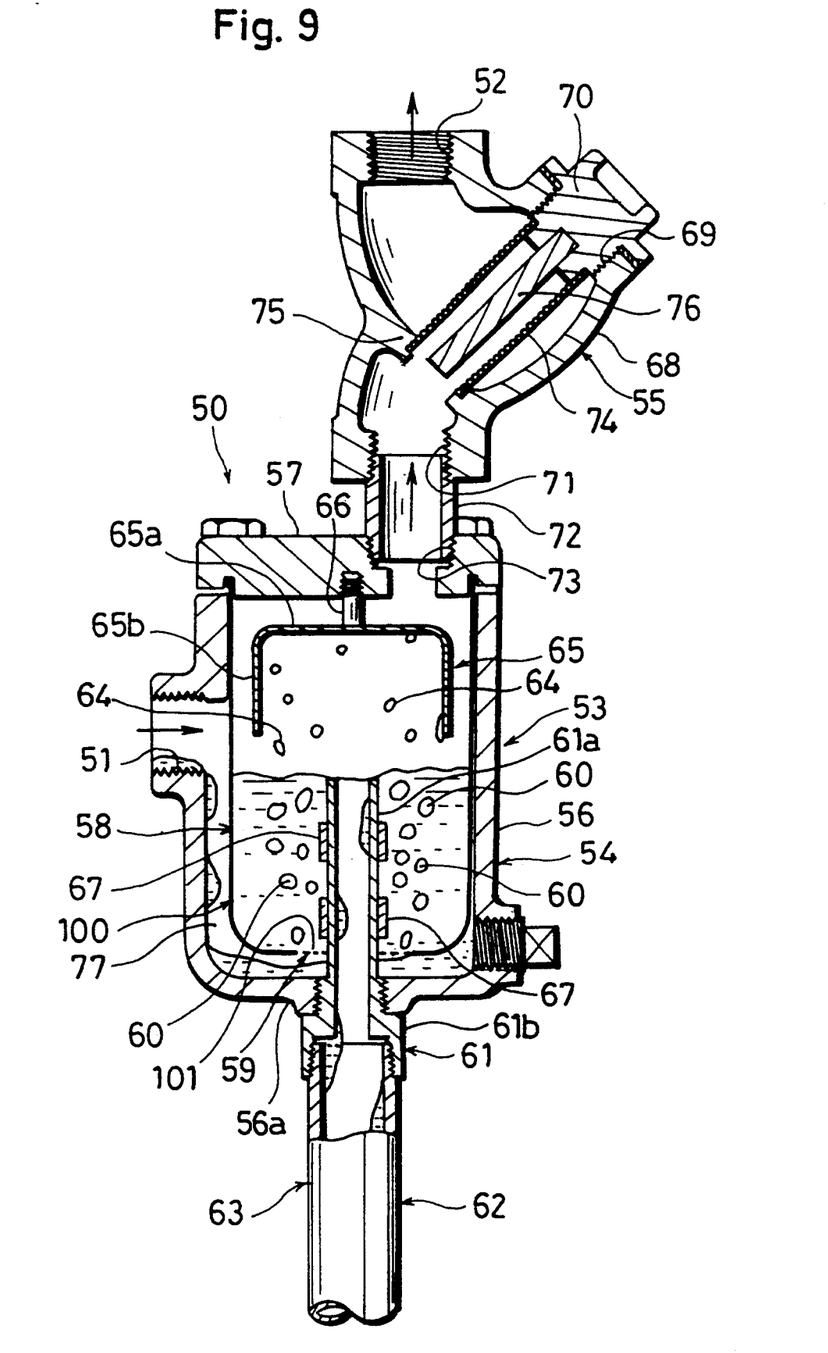
FIG. 9 is a longitudinal sectional view of a principal portion of a removing mechanism for extraneous matter which is selectively attached to the heating system of the present invention.

FIG. 9 shows a removing mechanism 50 for extraneous matter, which is selectively attached to the heating pipe 2. In the preferred embodiment of the present invention, this removing mechanism is attached to the upstream side end portion of the heating pipe 2.

The extraneous-matter removing mechanism 50 comprises a container 53 provided with a vapor inlet 51 through which the vapor and condensation are fed from a vapor feeder unit (not shown) thereinto, and a vapor outlet 52 which only feeds the vapor to the steam tube 4 of the heating pipe 2.

Also, this container 53 comprises a first section 54 provided with the vapor inlet 51, and a second section 55 formed with the vapor outlet 52 therein.

The first section 54 is provided with an upwardly opened body portion 56, and a lid member 57 which covers the upwardly opened portion of the body portion 56, and the vapor inlet 51 is made in a side wall of the body portion 56.

The first section 54 is formed with a condensation reservoir 58 therein. This condensation reservoir 58 has a partitioning cylinder 100 fitted thereinto, and this cylinder 100 is formed with a jet port 101 at the bottom thereof. This jet port 101 is upwardly opened at the bottom portion of the condensation reservoir 58, and is communicatively connected to the vapor inlet 51. Moreover, this jet port 101 is fitted with a first screen means 59.

The first screen means 59 comprises, for example, a plate having a great number of perforations made therein, which forms the bottom of the partitioning stainless steel cylinder 100. Rust, scale and/or other extraneous matter contained in the condensation and vapor which are introduced into the container 53 from the vapor inlet 51 are filtered by means of the first screen means 59.

The vapor passing through the jet port 101 also goes through the condensation reservoir 58 in the form of air bubbles subdivided by using the first screen means 59.

The body portion 56 has a threaded tubular body 61 engaged with a threaded bottom wall portion 56a thereof, and a small-diameter portion 61a of this tubular body 61 extends into the condensation reservoir 58 through the first screen means 59. On the other hand, a large-diameter portion 61b of this tubular body 61 has a pipe 62 communicatively connected thereto.

The pipe 62 and the tubular body 61 form a discharging pipe 63 which is used to discharge any higher amount of condensation than predetermined within the condensation reservoir 58. That is to say, if the top level of the condensation exceeds the upper end of the small-diameter portion 61a of the tubular body 61, the condensation enters the tubular body 61 from the upper opening portion of the small-diameter portion 61a, and is discharged through the pipe 62.

A plate 65 is arranged such as to overhang the condensation reservoir 58, thereby allowing condensational splashes 64 to be returned to the condensation reservoir 58. This plate 65 is provided with an upper wall portion 65a and side wall portions 65b, and the upper wall portion 65a is connected to the lid member 57 through a threaded connecting rod 66 which is engaged with the lid member 57 correspondingly threaded.

Also, the small-diameter portion 61 of the tubular body 61 has a first magnet means 67 attached thereto, thereby allowing the first magnet means 67 to attract magnetic extraneous matter within the condensation reservoir 58.

The second section 55 of the container 53 of the extraneous-matter removing mechanism 50 is provided with a body portion 68 having the vapor outlet 52, and a lid member 70 which covers an opening portion 69 of the body portion 68. This second section 55 is provided with a lower opening portion 71, and this opening portion 71 is communicatively connected to an opening portion 73 made in the lid member 57 of the first section 54 through a cylindrical connecting body 72. Also, the lid member 70 is fitted with a second screen means 74 in a tubular configuration. This second screen means 74 is made of, for example, wire gauze, sintered porous material or other suitable material. The vapor introduced into the opening portion 71 through the cylindrical connecting body 72 passes through this second screen means 74, and enters the steam tube 4 of the heating pipe 2 from the vapor outlet 52. The second screen means 74 is attached in one end portion thereof to the lid member 70, and is connected in the other end portion thereof to an inside flange portion 75 within the body portion 68 of the second section 55.

The lid member 70 is fitted with a second magnet means 76 which is located within the second screen means 74. With such arrangements, if the vapor enters the second section 55 from the first section 54 through the opening portion 71, this vapor passes through the second screen means 74, and goes out of the vapor outlet 52. In this case, microscopic extraneous matter which has passed through the condensation reservoir 58 adheres to the second screen means 74, and also, magnetic extraneous matter is attracted to and by means of the second magnet means 76.

The operation of the extraneous-matter removing mechanism 50 is next described.

Firstly, the condensation and the vapor are introduced into the container 53 from the vapor feeder unit (not shown) through the vapor inlet 51. In this case, the condensation enters a clearance 77 between the partitioning cylinder 101 and the inner surface of the body portion 56 of the first section 54, and on the other hand, the vapor in the form of subdivided air bubbles 60 enters the condensation reservoir 58 from the clearance 77 through the first screen means 59. The transformation of the vapor into the subdivided air bubbles 60 increases the contact areas of the vapor and the condensation staying in the condensation reservoir 58 with each other, whereby small-sized extraneous matter passing through the first screen means 59 can be taken into the condensation within the condensation reservoir 58.

The vapor which has entered the condensation reservoir 58 upwardly rises therethrough in the form of air bubbles 58. This vapor in the condensation reservoir 58 contains microscopic extraneous matter which has passed through the first screen means 59, and the majority of this extraneous matter remain in the condensation within the reservoir 58.

The condensation is continuously accumulated in the condensation reservoir 58, and if the condensation reaches a predetermined amount thereof within the reservoir 58, or if the top level of the condensation within the reservoir 58 extends to the upper end of the tubular body 61, the condensation flows into the upper opening portion of the tubular body 61, whereby the condensation does not stay above the upper end of the tubular body 61.

Also, the condensation within the condensation reservoir 58 is stirred as a result of rising operations of air bubbles of the vapor therethrough, and the majority of extraneous matter which suspends in the condensation is discharged together with an overflow of the condensation. In this case, a part of the extraneous matter precipitates on the bottom surface of the condensation reservoir 58, and magnetic extraneous matter is attracted to the first magnet means 67.

A part of the condensation upwardly rises from the top surface thereof in the form of splashes together with the vapor, and comes into contact with the plate 65, whereby it is returned to the condensation reservoir 58. If the condensation in the form of splashes includes extraneous matter, this extraneous matter is also returned to the condensation reservoir 58.

The vapor which has passed through the condensation reservoir 58 advances to the second screen means 74 through the cylindrical connecting body 72, and if this vapor includes extraneous matter, this extraneous matter adheres to the second screen means 74, and if this extraneous matter is magnetic, it is attracted to and by means of the second magnet means 76.

Therefore, the vapor fed out of the vapor outlet 52 to the steam tube 4 of the heating pipe 2 is substantially free from rust, scale or other extraneous matter, and is therefore good in the quality thereof.

It is therefore to be understood that the conveyor-pipe heating system equipped with the extraneous-matter removing mechanism arranged as described in the foregoing is free from any adhesion of scale or other extraneus matter to the inner wall of the steam tube 4 of the heating pipe 2 thereof, to thereby prevent any hindrance of thermal conduction thereof.

Also, in the conveyor-pipe heating system fitted with the extraneous-matter removing mechanism, the temperature sensing valve 12 and the other valve means are also free from any adhesion of scale or other similar extraneous matter to them. Therefore, this conveyor-pipe heating system does not undergo any instability in the temperature control intended therefor owing to leakage of the condensation or vapor which can be caused by adhesion of extraneous matter to the valve means.

Figure 10:
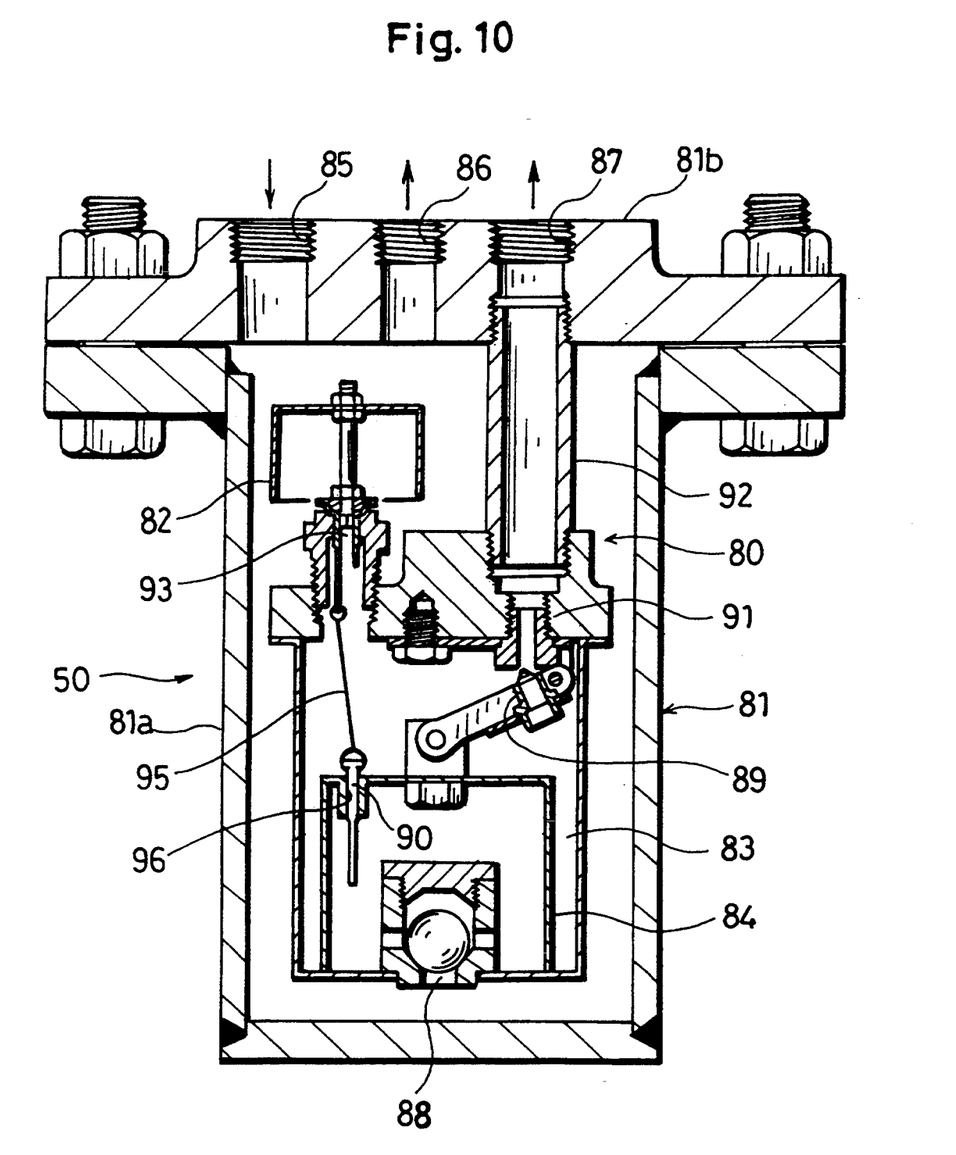
FIG. 10 is a sectional view of a removing mechanism for removing extraneous matter which is of a different type than illustrated in FIG. 9.

FIG. 10 shows a different type removing mechanism 50 for extraneous matter. This extraneous-matter removing mechanism 50 is provided with a container 81 comprising a fluid accumulating chamber 80, a float means 82 located within the container 81, a bucket chamber 83 formed within the container 81, an inverted bucket 84 within the bucket chamber 83 and other necessary components.

The container 81 comprises an upwardly opened container body 81a, and a lid member 81b which covers the upper opened portion of the container body 81a. The lid member 81b is provided with a vapor inlet 85, a vapor outlet 86 and a condensation outlet 87.

The bottom wall of the bucket chamber 83 is formed with an influx port 88 equipped with a check valve, and the condensation and vapor within the fluid accumulating chamber 80 are introduced into the inverted bucket 84 through this influx port 88.

The inverted bucket 84 is provided with a valve means 89 on the upper wall thereof through a swinging arm, and also, a stem type valve member 90 is slidably inserted through a vent 96.

The bucket chamber 83 is provided with a discharging hole 91 at an upper portion thereof, and this discharging hole 91 is communicatively connected to a condensation outlet 87 through a connecting passage 92. The discharging hole 91 is closed by using the valve means 89 as a result of the elevation of the inverted bucket 84, and the descent of the inverted bucket 84 allows the valve means 89 to open the discharging hole 91. FIG. 10 shows an open state of the discharging hole 91.

The bucket chamber 83 is also provided with a second discharging hole 93 at an upper portion thereof. This discharging hole 93 is closed by using a supporting member 94 which holds the float means 82. This supporting member 94 and the stem type valve member 90 are connected to each other by using a linking means 95 such as a chain or other suitable means. As a result, if the float means 82 rises upwardly, the supporting member 94 and therefore the valve member 90 are respectively lifted, to thereby allow the vent 96 to be opened.

Description is next made of the operation of the extraneous-matter removing mechanism 50 arranged as described in the preceding.

The vapor which enters the container 81 from the vapor inlet 85 is discharged from the vapor outlet 86. The condensation within the container 81 comes into the bucket chamber 83 from the influx port 88 equipped with a check valve, and is discharged from the condensation outlet 87 through the discharging hole 91.

If the condensation decreases in the amount thereof within the fluid accumulating chamber 80 to such a degree that the top level of this condensation drops below the influx port 88, the vapor flows into the inverted bucket 84 from the influx port 88, to thereby allow the inverted bucket 84 to surface within the bucket chamber 83 which is filled with the condensation.

If the inverted bucket 84 thus surfaces or rises, the valve means 89 arranged to cooperate with the inverted bucket 84 closes the discharging hole 91, to thereby prevent any discharge of the condensation. Since the discharging hole 91 is thus closed by using the valve means 89, the condensation is gradually collected in the fluid accumulating chamber 80.

Also, if the condensation is accumulated in the fluid accumulating chamber 80 to such a degree that the condensation allows the float means 82 to surface or rise, the rising operation of the float means 82 opens the discharging hole 93, while at the same time, the stem type valve member 90 is lifted, and the vent 96 is accordingly opened, whereby the vapor within the inverted bucket 84 is sent out from the discharging hole 93 into the fluid accumulating chamber 80, and subsequently, this vapor is discharged from this fluid accumulating chamber 80 through the vapor outlet 86.

If the vapor is discharged out of the inverted bucket 84, the inverted bucket 84 is deprived of buoyancy, and therefore sinks. This causes the valve means 89 to be moved from the fully closed position thereof to the fully open position thereof, thereby allowing the condensation to be discharged from the discharging outlet 91.

For this reason, the fluid accumulating chamber 80 of the container 81 allows the condensation to always exist therein without any overflow or exhaustion thereof As a result, the vapor which has been introduced into the container 81 from the vapor inlet 85 comes into contact with the condensation, and thereafter, flows from the vapor outlet 86 into the steam tube 4 of the heating pipe 2. In this case, if the vapor supplied from the vapor inlet 85 includes extraneous matter, this extraneous matter is taken into the condensation, whereby the effluent vapor from the vapor outlet 86 is allowed to be turned into the vapor of good quality which is free from extraneous matter.

In the conveyor-pipe heating system according to the present invention, the conveyor pipe 1 can be evenly heated at any longitudinal portion thereof, whereby the internal heavy oil or other fluid of the conveyor pipe 1 is allowed to remain constant in the temperature thereof.

Also, the heating system of the present invention uses the feedback type automatic control technique to regulate surface temperatures of the heating tube 2. Therefore, this heating system is quicker in the responsiveness thereof to variations in surface temperatures of the conveyor pipe, to thereby hold the internal heavy oil or other fluid of the conveyor pipe at a desired temperature with high accuracy. This insures a decrease in the viscosity of the internal fluid of the conveyor pipe, thereby achieving the smooth conveyance of the internal fluid of the conveyor pipe.

Moreover, in the heating system according to the present invention, since the steam tube 4 of the heating pipe 2 has the condensation positively accumulated, a total of the heat quantity supplied to the conveyor pipe 1 can be reduced, to thereby prevent any excessive heating of the surface of the conveyor pipe. This allows the vapor to be economized in the working amount thereof.

Also, in shipment of this heating system to the installing field, the container 6 having the temperature sensing valve 12 accommodated therein is connected in advance to the downstream side end portion 2a of the heating pipe 2. Therefore, it is feasible to eliminate any works for connecting the container 6 to the downstream side end portion 2a of the heating pipe 2. This also causes the heating system to be extremely easily installed.

Moreover, in the heating system provided with the extraneous-matter removing mechanism, the vapor fed to the steam tube 4 of the heating pipe 2 is substantially free from rust, scale or other extraneous matter, whereby the heating system is free from any trouble in which adhesion of scale or other extraneous matter to the inner wall of the steam tube 4 hinders the heat conduction thereof, or in which adhesion of scale or other extraneous matter to the valve portion or other related portion of the temperature sensing valve 12 makes it unstable to control temperatures of the conveyor pipe.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

For example, although a corrugated tube is applied to the outer tube 3 of the heating pipe 2 in the preferred embodiments of the present invention which are described in the foregoing, a tube in a straight-shaped configuration may be alternatively used. However, if the outer tube 3 is of the corrugated type, the steam tube 4 does not come into close contact with the inner surface of the outer tube 3 even if the steam tube 4 becomes loose in the mounting state thereof, and is brought into abutment with the inner surface of the outer tube 3. Therefore, the corrugated steam tube 4 makes it difficult that the heat of the steam tube 4 is directly conducted to the outer tube 3, and the steam tube 4 can heat the working fluid over the entire outer circumferential surface thereof. This is an advantage of the application of the corrugated steam tube.

Also, the container 6 may be attached to the conveyor pipe 1 or may remain unattached thereto. However, the container itself is desired to be located such that the discharging hole 7 is upwardly turned. See FIG. 1.

In the foregoing preferred embodiments of the present invention, the temperature sensing valve 12 is predetermined in the operating temperature thereof for 40° C. However, this operating temperature of the temperature sensing valve can be changed according to the kind of the internal fluid of the conveyor pipe 1 or other conditions.

Moreover, the present invention can be applied to other uses than described in the foregoing. For example, the instrumentation system is provided with a water equipment for heating the lead tube thereof, and the present invention can be applied to this water equipment to prevent the freeze of the internal water thereof. Also, the present invention is applicable to a heating equipment for thawing out frozen roads in cold districts.

We claim:

1. A heating system for conveyor pipes wherein a long heating pipe provided with an outer tube having an operating fluid hermetically contained therein, and a steam tube inserted through said outer tube is arranged along a conveyor pipe to be heated and in contact with the outer surface of said conveyor pipe, comprising a container which is located on the downstream side end portion, and which accumulates condensation formed as a result of the liquefaction of vapor fed through the steam tube of said heating pipe from the upstream side thereof, and has the heating pipe inserted thereinto by predetermined length of the downstream side end portion thereof, and a temperature sensing valve communicatively connected to the downstream side end portion of the steam tube of the heating pipe, which is inserted in said container, the valve being arranged to be closed if the condensation is more increased in the temperature thereof than predetermined, and to be opened if the condensation is more decreased in the temperature thereof than predetermined.

2. A heating system for conveyor pipes, comprising;
a long heating pipe arranged along the conveyor pipe to be heated and in contact with the outer surface of said conveyor pipe, said heating pipe comprising an outer tube hermetically containing an operating fluid, and a steam tube inserted through said outer tube;
a container which is located on the downstream side end portion, and which accumulates condensation formed as a result of the liquefaction of vapor fed through the steam tube of said heating pipe from the upstream side thereof, and has the heating pipe inserted thereinto by predetermined length of the downstream side end portion thereof;
a temperature sensing valve communicatively connected to the downstream side end portion of the steam tube of the heating pipe, which is inserted in said container, the valve being arranged to be closed if the condensation is more increased in the temperature thereof than predetermined.

3. The heating system for conveyor pipes as set forth in claim 1, wherein an outer tube of the heating pipe is a metallic corrugated tube.

4. The heating system for conveyor pipes as set forth in claim 1, wherein the outer tube of the heating pipe has an anticorrosive treatment applied to the outer surface thereof.

5. The heating system for conveyor pipes as set forth in claim 1, wherein the outer tube of the heating pipe is provided with a synthetic-resin sheath.

6. The heating system for conveyor pipes as set forth in claim 1, wherein an internal fluid of a conveyor pipe to be heated by using said heating system has solidifiability or viscosity increasing property at a low temperature, and is subjected to pyrolysis under a high temperature.

7. A heating system for conveyor pipes, wherein a long heating pipe provided with an outer tube having an operating fluid hermetically contained therein, and a steam tube inserted through said outer tube is arranged along a conveyor pipe to be heated and in contact with the outer surface of said conveyor pipe, while at the same time, the heating pipe is provided with a removing mechanism for extraneous matter on the upstream side end portion thereof to eliminate rust, scale or other extraneous matter contained in vapor fed from a vapor feeder unit, said removing mechanism comprising a container provided with a vapor inlet through which condensation and vapor are fed, and a vapor outlet feeding the steam tube of the heating pipe with vapor alone, a first screen means mounted within said container and allowing internal extraneous matter of the condensation and vapor to adhere thereto, a condensation reservoir which is formed within said container and through which the vapor passing through said first screen means and containing microscopic extraneous matter passes in the form of air bubbles, and a second screen means to which microscopic extraneous matter passing through said condensation reservoir adheres, and which feeds the vapor outlet with the vapor alone.

8. The heating system for conveyor pipes as set forth in claim 7, wherein a first magnet means attracting magnetic extraneous matter is arranged within condensation reservoir.

9. The heating system for conveyor pipes as set forth in claim 7, wherein a second magnet means attracting magnetic extraneous matter is arranged within the second means.

10. The heating system for conveyor pipes as set forth in claim 7, wherein a plate is arranged over the condensation reservoir to return condensational splashes into said condensation reservoir.

11. The heating system for conveyor pipes as set forth in claim 7, wherein a discharging pipe is provided to discharge a surplus of the condensation over a predetermined amount thereof in the condensation reservoir.

* * * * *